United States Patent Office 3,037,359
Patented June 5, 1962

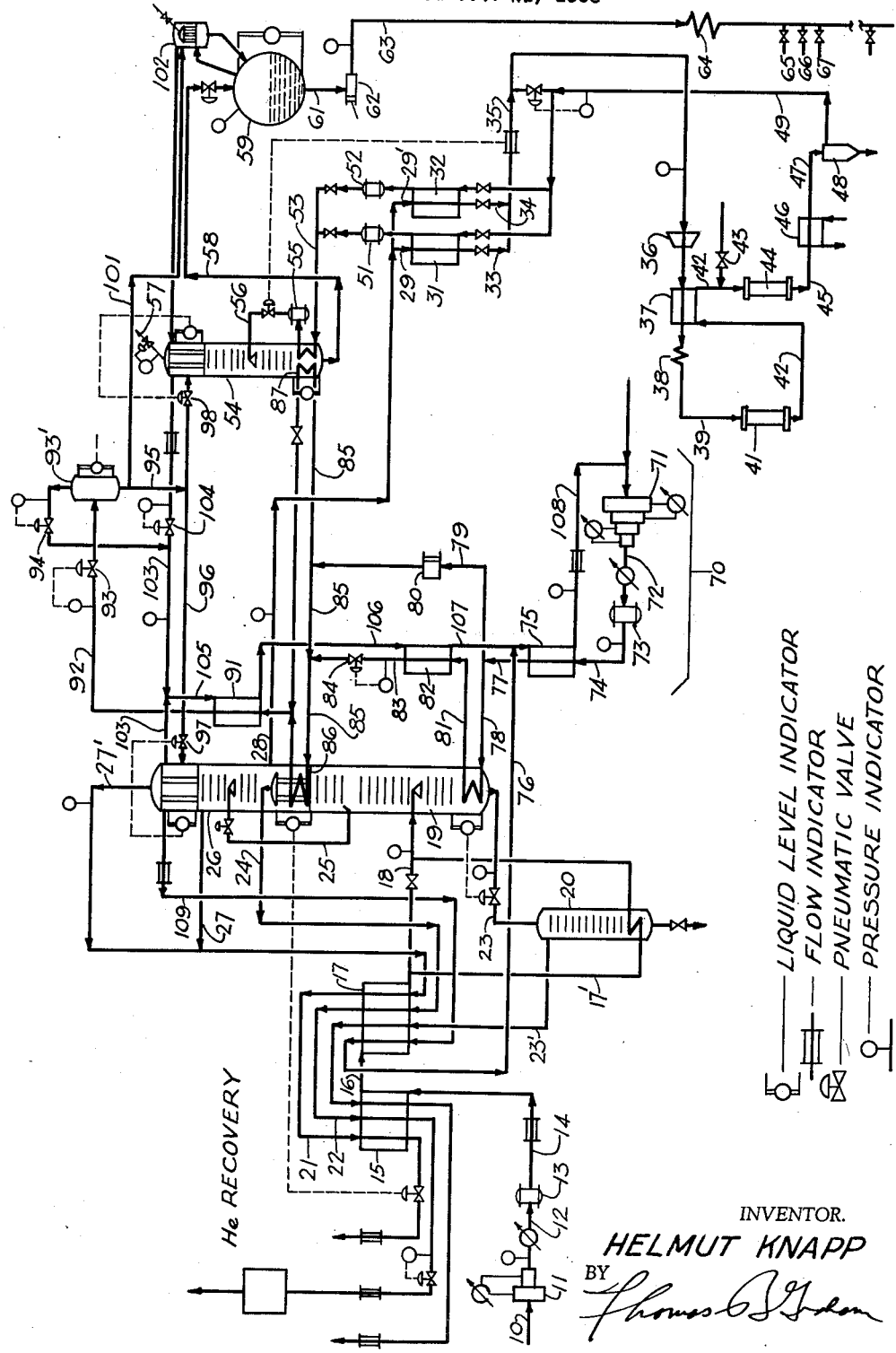

3,037,359
RARE GAS RECOVERY PROCESS
Helmut Knapp, Riverdale, N.Y., assignor to American Messer Corporation, New York, N.Y., a corporation of New York
Filed Oct. 21, 1958, Ser. No. 768,713
7 Claims. (Cl. 62—22)

This invention relates to the production of rare gases and their recovery in pure form from mixtures of gases, particularly waste gas streams obtained from synthesis gas plants, the streams usually being characterized by the fact that they are complex mixtures of many components, generally including nitrogen and carbon monoxide, together with hydrogen, oxygen, methane, and ammonia, accompanied by significant proportions of argon and occasionally helium and smaller amounts of krypton, xenon.

A very large industrial use for argon is as an inert atmosphere in welding operations and in other metallurgical operations where pure metals must be produced. Argon, krypton and xenon occur only as a minor constituent of the atmosphere and, accordingly, are economically recoverable only as by-products of air separation plants.

It is, accordingly, a fundamental object of this invention to provide a process particularly useful for the manipulation of waste gas streams containing significant amounts of argon, helium and krypton, i.e., rare gases, accompanied by various other gases, such as ammonia, hydrocarbon gases, hydrogen and other by-products of whatever synthesis has occurred.

The process in accordance with this invention may, therefore, be characterized as one in which the rare gases are separated from a gas stream which normally could be considered a waste product of an ammonia synthesis unit where hydrogen has been generated by partial oxidation of natural gas, or other gas generator process. Inasmuch as rare gases do not react chemically, they accumulate in such systems and finally appear as a residual distillate in one of the nitrogen scrubbing towers or in a final residual treatment of reactors for ammonia synthesis. In general, the mixtures in which the rare gases occur are quite complex and, in the past, they have always been vented to the atmosphere together with all the components.

In accordance with the process of this invention, therefore, such waste gas streams, in general, having in common the characteristic that they will contain a significant amount of argon, usually at least 1 percent, and often substantially more, sometimes up to 25 percent, possibly some helium, sometimes up to 6 percent, and krypton and xenon in concentration about 10 times higher than in air, are subjected to compression, refined by distillation and some chemical reaction in a sequence of steps such that technically pure argon is recovered substantially quantitatively from a gas stream; krypton, xenon are also recoverable.

A flow diagram for the process is given in FIGURE 1, and reference thereto will provide a better understanding of the invention.

A typical common analysis of the waste gas stream obtained from an ammonia synthesis process would be the following:

TABLE I

Composition of Waste Streams

| | N₂ Scrubbing Tower | NH₃ loop |
|---|---|---|
| | Percent | Percent |
| H₂ | 3 | 34 |
| N₂ | 33 | 11 |
| CO | 40 | |
| Ar | 14 | 15 |
| O₂ | 0.1 | |
| CH₄ | 9.9 | 15 |
| Kr | 16 p.p.m. | |
| NH₃ | | 25 |

These gases may vary widely in composition from the data listed. Depending on the helium concentration in the natural gas from which the synthesis gas was produced, up to 6 percent helium can be contained in the waste stream of an ammonia loop.

Referring now to the drawing showing the flow sheet and tracing the course of gas from the feed inlet to product recovery, it will be seen the process is adapted to the fractionation of the bottom product from a nitrogen scrubbing tower to produce a high purity argon and methane of 90–95 percent purity. The process may basically be considered as having three stages, one, in which all components heavier than argon are removed; second, the crude argon fraction passes to the second stage of the distillation column and is separated to give a concentrated argon stream, third, the concentrated argon stream is then purified, first, chemically and then, second, by additional distillation.

The system having as a characteristic feature the use of a nitrogen loop or cycle for heating and cooling in the distillation zones (or the use of a gas having approximately the boiling point of nitrogen) is, as a result, not sensitive to the quantity of feed, nor the composition of the feed. Hence, specific temperatures and pressures at different points in the system will depend upon the exact composition of the starting gas.

In the drawing conventional symbols as identified in the drawing, have been used to identify preferred points for location of valves, pressure gauges and flow indicators.

Referring now to the drawing, a feed gas mixture corresponding essentially to that reported in Table I is passed through line 10 in the direction indicated by the arrow, into a 2-stage compressor unit 11, and thence through line 12 to a filter 13 for the removal of oil entrained in the gas.

The feed may be considered as having come from the bottom of a nitrogen scrubbing unit where a nitrogen-hydrogen synthesis gas mixture is washed with liquid nitrogen in order to remove carbon monoxide, oxygen, argon, and methane. The dew point of the feed gas will, therefore, generally be about −180° C. (290° F.). At the compressor 11 the feed gas is compressed to a pressure of about 9 atmospheres (128 lbs. per square inch absolute). The exact level to which it is compressed depends on the hydrogen content. With high hydrogen content, the pressure employed could be 15–20 atmospheres. Since the process of compression will introduce a certain quantity of oil into the gas, this is removed by filtering it through a conventional filter 13, which may consist of charcoal and felt.

The gas leaves filter 13 via line 14 to pass through heat exchanger 15 and thence via line 16 through heat exchanger 17, and from there via line 18 to distillation column 19 which it enters at a level corresponding to its composition.

In heat exchangers 15 and 17 the feed gas is cooled by running countercurrent to the product stream and, because argon is withdrawn from the system as a liquid and, therefore, a correspondingly lesser volume of material is returned through heat exchangers 15 and 17, a portion of the nitrogen cycle may be passed through heat exchangers to offer additional refrigeration for the feed gas. This is indicated by the lines 109 and 76.

The feed gas having entered rectification column 19, forms a methane concentrate at the bottom of the tower, is enriched to a concentration of 90 percent or higher, which is drawn through line 23 to be fed back through heat exchangers 17 and 15 for additional cooling and then to storage. From the top of rectification column 19 a non-condensible mixture containing all of the hydrogen is vented through lines 24 and 22.

For the recovery of krypton and xenon the methane portion is expanded into the top of an auxiliary column where it is separated from krypton and xenon. The vapor in the column is generated by a coil in the bottom where the feed gas, fed through the line 17′, or a portion of it is further cooled.

The krypton xenon mixture is withdrawn at the bottom for the purification treatment. The methane vapor leaves the column on top through line 23′ and enters heat exchanger 17. All the helium will be accumulated in the $H_2$ vent stream. It is recovered by further treatment of the hydrogen portion after it has passed through the heat exchangers 17 and 15.

From the intermediate point of the rectification column 19 a mixture of argon, carbon monoxide and nitrogen is transferred by way of line 25 to column 26 where the argon is separated from the nitrogen and carbon monoxide. The latter components are vented from the system through line 27 and 27′ at the top of the column to heat exchanger 17, line 21, and heat exchanger 15. Argon is concentrated at the bottom of the column to be withdrawn through line 28.

In general the pressure in the column 19 will be the discharge pressure of compressor 11. The higher the pressure in the column, the higher the hydrogen content at vent 24.

It is to be understood that columns 19 and 26 may be two physically separate units or they may be a single unit divided into two sections, with one appropriately separated from the other. The preferred form is shown in the drawing, i.e., a single column, separated into two sections.

The crude argon drawn off from the bottom of column 26 through line 28 remains contaminated with traces of nitrogen, carbon monoxide, oxygen, and methane. Purification of the argon to a higher degree is accomplished by chemical reaction in the second and non-distilling portion of the system.

A stream of crude argon vapor obtained as a product from the rectification towers is passed through line 28, through to line 29 or 29′, through heat exchanger 31 or 32 to be warmed. From there it passes by way of line 33 or 34, to line 35, whereupon it passes to blower 36, heat exchanger 37 and thence to heater 38, line 39 and reactor 41. At reactor 41 the carbon monoxide and methane react in the presence of a palladium catalyst, for example, with the oxygen in the mixture to form carbon dioxide and water. Compression by the blower 36 is about 2–3 atmospheres absolute. The temperature at reactor 41 is determined by the space velocity in the reactor and amount of carbon in the gas stream. Substantially quantitative burning of carbon is sought.

The gas from the reactor passes through line 42 back to heat exchanger 37, where it is cooled to a temperature of about 100° F. It then passes through line 42 where hydrogen is introduced through valve 43 and the gas mixture is then passed to reactor 44 where in contact with a platinum catalyst hydrogen and oxygen react to form water. Here again quantitative reaction is sought. Argon leaves the reactor by line 45 to enter water cooler 46 from which it passes by line 47 to condenser and separator 48. Here water formed by reactor of oxygen with hydrogen is removed and the purified argon passes by line 49 back to heat exchanger 31 or 32. A caustic scrubber to remove residual traces of carbon dioxide may be inserted in the line 49 between 48 and the heat exchangers 31 and 32.

Heat exchangers 31 and 32 are used in alternation. Residual water and the carbon dioxide are frozen out of the purified argon. Any carbon dioxide and ice which might be carried over with the argon is entrapped on the mechanical filters 51 and 52. The purpose of the dual heat exchangers, filters and bypass lines is purely to permit alternate use of these elements of equipment so that in continuous operation, one of them may be derimed while the other is on stream.

For further purification the argon is passed by line 53 through the base of tower 54 into filter 55. The purpose of this cooling and liquefaction which occurs in tower 54 is to provide a useful filtering step to remove the last traces of carbon dioxide and $CH_4$.

Column 54 is the final distillation column in which the purified argon after passing through the base for liquefaction is fed through line 56 into the middle of the tower where it is rectified and simultaneously residual hydrogen and nitrogen are separated from the mixture and vented from the top of the column at 57.

The liquefied argon product is collected from the bottom of the column through line 58 and fed to storage tank 59. From the storage tank it may be fed through line 61 and pump 62 to main 63, which is equipped for filling cylinders under pressure by passing the liquid argon through heater 64, to evaporate it, and then to fill cylinders under pressure at 65, 66, 67 etc.

For most efficient operation of the process in accordance with this invention and to obtain the best results certain refinements in the operation of the rectification columns 19, 26, and 54 are desirable. That is, reflux and vapor in the columns are generated and controlled in aid of the accomplishment of the objectives of the invention, which are to effect a distillation to separate the argon and further purification by chemical reaction.

The nitrogen cycle is provided for the operation of the columns and the generation of refrigeration needed for the liquefaction of the argon as the product of the process and to compensate for the refrigeration losses. To the extent necessary nitrogen used may be obtained from an external source and fed into the system.

Referring now to the portion of the apparatus generally designated 70, nitrogen is compressed in compressor 71, which may be a 4-stage compressor, from which it passes through line 72 to filter 73 at a pressure, for example, of 1300 pounds per square inch absolute, through line 74 in its oil-free condition, to heat exchanger 75, countercurrent to low-pressure return nitrogen coming from heat exchanger 17 via line 76 and from heat exchanger 82 via line 107. The nitrogen stream after leaving heat exchanger 75, passes through line 77 whereupon it is divided, one portion passing via line 78 through the coil in the bottom of tower 19 to boil the liquid gas in that column. The second portion of the nitrogen passes through line 79 to expansion engine 80 where it is expanded to generate additional refrigerating capacity.

The high pressure stream of nitrogen leaving the coil in the bottom of the tower 19 passes via line 81 to heat exchanger 82 where it is further cooled. Downstream from heat exchanger 82 in line 83, the gas passes through expansion valve 84, by which means the actual back pressure on compressor unit 71 is controlled. The streams from expansion valve 84 are combined and liquefied by passing through line 85 in the coils 86 and 87 in the bottom of rectifying columns 26 and 54, respectively. The heat of condensation of the gas in each of these coils is used to boil the liquid in the bottom of the columns. The liquid in the bottom of the column 26 is further boiled by the heat transferred to the condenser on the top of column 19 where the reflux for the column 19 is liquefied. This is true in the preferred embodiment of the system, as shown, where column 26 is on top of column 19.

The liquefied nitrogen is sub-cooled in sub-cooler 91 and passed via line 92 through valve 93 to be collected in tank 93'. The valve 93 regulates the pressure in the coils 86 and 87. The vent valve 94 on the tank 93' regulates pressure in the tank. The liquid nitrogen accumulated in tank 93' is fed through line 95, through line 96 and valves 97 and 98 to the condensers on the tops of columns 26 and 54, respectively, where the reflux for these columns is condensed.

A similar quantity of liquid nitrogen is fed via line 101 to condenser 102, which is mounted on argon storage tank 59. The function of this condenser is to reliquefy such argon as evaporates due to heat leaks, cooling of pumps, or liquid containers in that section of the system.

Back pressure of two atmospheres absolute (29 pounds per square inch) is maintained in the condenser of column 54 and tank 59 to avoid having the argon freeze in these condensers.

The nitrogen vapor generated in the condensers of columns 26 and 54 is collected through line 103, and fed through line 105 back to sub-cooler 91, line 106, heat exchanger 82, line 107, heat exchanger 75, line 108 and compressor 71. A second branch of the nitrogen cycle employs line 109 to feed a stream of nitrogen to heat exchanger 17 and thence via line 76 to line 107, where it joins the nitrogen stream being recycled for compression.

Accordingly from the description of the process and arrangement of the nitrogen cycle used as the thermal driving means, it will be apparent that the system has remarkable flexibility in that it is virtually independent of the composition of the gas used as a feed, from which the argon is to be separated and, also, it is virtually independent of the quantity of gas which is fed into the system. The thermal driving means has been described in terms of the nitrogen cycle, because nitrogen is a freely available gas and has about the right boiling temperature to permit activating the system. However, any gas or mixture of gases having a boiling point approximating that of nitrogen, would be useful for the purpose. For example, a mixture of carbon monoxide and nitrogen would be useful. This driving gas consisting essentially of nitrogen, or having the boiling point of nitrogen, is supplied from an external source to the extent necessary. Actually, in any waste gas subjected to the process, there will be a certain accumulation of nitrogen as a by-product, which nitrogen may be utilized by incorporating it into the system. The cycle through which the nitrogen is put is that nitrogen vapor is used for heating in places where it is fed and liquid nitrogen is used for cooling.

Although the invention has been described in terms of only a single specific embodiment, it will be apparent that the principles of operation may be generalized and related to a variety of mixtures of gases and that variations of the process may be practiced without departing from the spirit or scope of the invention.

What is claimed is:

1. A process for the separation of rare gas from complex gas mixtures from vent streams of ammonia synthesis having a typical composition approximating the following: 1–25 percent of argon, 0–6 percent helium, up to 15 p.p.m. krypton, up to 1.2 p.p.m. xenon, nitrogen 30–40 percent, about 30–40 percent carbon monoxide, about 10 percent methane, about 3 percent of hydrogen and a trace of oxygen, comprising, feeding said gas mixture to a gas separation system, and thereupon, in the system, compressing and liquefying said feed gas mixture, passing the liquefied mixture to a first distillation zone and fractionating it to produce (1) a first argon fraction, (2) a highly volatile fraction containing any hydrogen and helium from the feed gas and (3) a fraction heavier than argon, containing krypton and xenon from the feed gas, passing said first argon fraction to a second distillation zone, removing said highly volatile fraction from said system, and recovering a preliminary argon fraction, fractionating said preliminary argon fraction into a concentrated argon fraction, and a volatile fraction containing substantially no argon, passing said concentrated argon fraction to a purification stage, chemically refining said argon to remove extraneous gases, passing said purified argon to a final distillation zone, fractionating said purified argon and recovering from said zone an argon fraction which is substantially pure.

2. The process in accordance with claim 1 in which the fraction heavier than argon from said first stage distillation is further fractionated to separate a fraction consisting essentially of krypton and xenon.

3. The process in accordance with claim 2 in which nitrogen in said gas is employed in the system, comprising passing nitrogen recovered in said first distillation stage to a compression stage, thereafter passing said nitrogen into the base of said first distillation zone to heat the lower boiling fraction of gas collected there, passing said nitrogen to the base of second and third distillation zones to boil gas there, thence passing it through a cooling zone to liquid storage, and from storage passing at least part of said nitrogen to the distillation zones of the second and third stages to cool reflux therein, and thence, recombining said nitrogen streams with feed from said storage tank and passing it countercurrent to nitrogen being circulated in said system in heat exchange relationship.

4. The process in accordance with claim 3 in which a crude argon stream is passed to compression and heating stages, thence to a purification zone in which it is heated and passed to a reaction zone, so that accompanying combustible gases are reacted with oxygen and hydrogen in said crude argon stream to form carbon dioxide and water, and subsequently liquefying and freezing said water and carbon dioxide and removing them in frozen form from said argon carrier.

5. In a three-stage distillation process for the recovery of rare gas from waste gas streams produced in ammonia synthesis in accordance with claim 3, the improvement comprising, providing a nitrogen loop in said system in which nitrogen is compressed and liquefied and, in being passed to storage is passed into said distillation zones to heat gas in the base of said first, second and third stages of distillation prior to being returned to storage, a portion of said nitrogen being taken from storage and employed as a coolant for reflux in said second and third stages of distillation, and also as a coolant in the pre-cooling stage of feeding gas to said process, said nitrogen streams thereafter being recombined, and returned to compression.

6. The process in accordance with claim 5, wherein said nitrogen streams are passed countercurrent to each other in heat exchange zones between said first and second stages of distillation as well as between said second and third stages of distillation and storage.

7. The process for the recovery of rare gas in accordance with claim 5, wherein the back pressure on the nitrogen cycle is controlled, comprising, employing a single feed valve between the first stage of distillation and said second stage of distillation in the liquefied nitrogen conduit.

References Cited in the file of this patent

UNITED STATES PATENTS

| | | |
|---|---|---|
| 1,360,853 | Wucherer et al. | Nov. 30, 1920 |
| 2,545,778 | Haringhuizen | Mar. 20, 1951 |
| 2,595,284 | Mullins | May 6, 1952 |
| 2,784,560 | Johnson | Mar. 12, 1957 |
| 2,824,433 | Kohler | Feb. 25, 1958 |
| 2,826,480 | Webster | Mar. 11, 1958 |
| 2,874,030 | Dennis | Feb. 17, 1959 |
| 2,960,476 | Eastman et al. | Nov. 15, 1960 |
| 2,982,107 | Smith | May 2, 1961 |